United States Patent
Xiu et al.

(10) Patent No.: US 12,200,220 B2
(45) Date of Patent: Jan. 14, 2025

(54) GEOMETRIC PARTITION MODE WITH MOTION VECTOR REFINEMENT

(71) Applicant: BEIJING DAJIA INTERNET INFORMATION TECHNOLOGY CO., LTD., Beijing (CN)

(72) Inventors: Xiaoyu Xiu, San Diego, CA (US); Wei Chen, San Diego, CA (US); Che-Wei Kuo, Beijing (CN); Yi-Wen Chen, San Diego, CA (US); Tsung-Chuan Ma, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 109 days.

(21) Appl. No.: 18/074,415

(22) Filed: Dec. 2, 2022

(65) Prior Publication Data
US 2023/0115074 A1    Apr. 13, 2023

Related U.S. Application Data

(63) Continuation of application No. PCT/US2021/035760, filed on Jun. 3, 2021.
(Continued)

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/176* (2014.11); *H04N 19/70* (2014.11)

(58) Field of Classification Search
CPC ............... H04N 19/105; H04N 19/119; H04N 19/132; H04N 19/139; H04N 19/137; H04N 19/52; H04N 19/70
See application file for complete search history.

(56) References Cited

U.S. PATENT DOCUMENTS

| 11,070,820 B2 | 7/2021 | Zhang et al. |
| 2021/0051324 A1 | 2/2021 | Zhang et al. |

(Continued)

FOREIGN PATENT DOCUMENTS

| WO | 2020094049 A1 | 5/2020 |
| WO | 2020094075 A1 | 5/2020 |

(Continued)

OTHER PUBLICATIONS

"Geometric Partitioning Mode in Versatile Video Coding: Algorithm Review and Analysis"—Gao et al., IEEE Transactions on Circuits and Systems for Video Technology; Date of Publication: Nov. 24, 2020. (Year: 2020).*

(Continued)

*Primary Examiner* — Mainul Hasan
(74) *Attorney, Agent, or Firm* — Arch & Lake LLP

(57) ABSTRACT

Methods, apparatuses, and non-transitory computer-readable storage mediums are provided for decoding a video block in geometry partition mode (GPM). The method may include partitioning the video block into first and second geometric partitions. The method may include obtaining a first motion vector refinement (MVR) for the first geometric partition. The method may include obtaining a second MVR for the second geometric partition. The method may include obtaining a candidate list that comprises a plurality of motion vectors (MVs). The method may include obtaining a first MV from the candidate list for the first geometric partition. The method may include obtaining a second MV from the candidate list for the second geometric partition.

(Continued)

The method may include calculating a third MV by adding the first MV with the first MVR for the first geometric partition. The method may include calculating a fourth MV. The method may include obtaining prediction samples.

18 Claims, 7 Drawing Sheets

Related U.S. Application Data

(60) Provisional application No. 63/034,365, filed on Jun. 3, 2020.

(51) Int. Cl.
  H04N 19/132 (2014.01)
  H04N 19/176 (2014.01)
  H04N 19/70 (2014.01)

(56) References Cited

U.S. PATENT DOCUMENTS

| | | | |
|---|---|---|---|
| 2021/0058617 A1* | 2/2021 | Reuze | H04N 19/537 |
| 2022/0329824 A1* | 10/2022 | Liao | H04N 19/157 |
| 2022/0353500 A1* | 11/2022 | Li | H04N 19/70 |
| 2022/0368930 A1* | 11/2022 | Filippov | H04N 19/52 |
| 2022/0385888 A1* | 12/2022 | Lee | H04N 19/136 |
| 2023/0080546 A1* | 3/2023 | Ma | H04N 19/157 |
| | | | 375/240.02 |
| 2023/0144567 A1* | 5/2023 | Panusopone | H04N 19/119 |
| | | | 375/240.02 |
| 2023/0421773 A1* | 12/2023 | Chen | H04N 19/132 |

FOREIGN PATENT DOCUMENTS

| | | |
|---|---|---|
| WO | 2020106189 A1 | 5/2020 |
| WO | 2020106564 A2 | 5/2020 |

OTHER PUBLICATIONS

"Geometric Partitioning Merge Mode with Motion Vector Refinement"—Panusopone et al., 978-1-7281-9320-5/20/$31.00 A © 2020 IEEE (Year: 2020).*
"Geometry-based Partitioning for Predictive Video Coding with Transform Adaptation"—Max et al., 978-1-5386-4160-6/18/$31.00 Å © 2018 IEEE (Year: 2018).*
"Geometry-Adaptive Motion Partitioning Using Improved Temporal Prediction"—Max et al., 978-1-5386-0462-5/17/$31.00 Å © 2017 IEEE (Year: 2017).*
Geometric Derived Motion Vector for Motion Prediction in Block-Based Video Coding—Sun et al., 978-1-5090-2175-8/17/$31.00 Å © 2017 IEEE (Year: 2017).*
Krit Panusopone, et al., "GEO with MMVD", Joint Video Experts Team (JVET) of ITU-T SG 16 WP 3 and ISO/IEC JTC 1/SC 29/WG 11, 18th Meeting: by teleconference, Apr. 15-24, 2020.(4P).
Benjamin Bross, et al., "Versatile Video Coding (Draft 8)", Joint Video Experts Team (JVET) of ITU-T SG 16 WP 3 and ISO/EC JTC 1/SC 29/WG 11, 17th Meeting: Brssels, BE, Jan. 7-17, 2020.(512P).
Xiaoyu Xiu, et al., "AHG12: Evaluation of GPM with MMVD for coding efficiency improvement over VVC", Joint Video Experts Team (JVET) of ITU-T SG 16 WP 3 and ISO/IEC JTC 1/SC 29, 22nd Meeting, by teleconference, Apr. 20-28, 2021.(4P).
International Search Report in Application No. PCT/US2021/035760 dated Sep. 27, 2021(3p).
Benjamin Bross et al., 'Versatile Video Coding (Draft 9)', JVET-R2001-vA, Joint Video Experts Team (JVET) of ITU-T SG 16 WP 3 and ISO/IEC JTC 1/SC 29/WG 11 18th Meeting: by teleconference, May 15, 2020 , (524p).

* cited by examiner

GEOMETRIC PARTITION MODE WITH MOTION VECTOR REFINEMENT

CROSS-REFERENCE TO RELATED APPLICATION

This application is a continuation application of PCT Patent Application No. PCT/US2021/035760, filed on Jun. 3, 2021, which is based upon and claims priority to Provisional Application No. 63/034,365 filed Jun. 3, 2020, the disclosures of which are incorporated herein by reference in their entireties for all purposes.

TECHNICAL FIELD

This disclosure is related to video coding and compression. More specifically, this disclosure relates to methods and apparatus on improving the coding efficiency of geometric partition (GPM) mode, also known as angular weighted prediction (AWP) mode.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

SUMMARY

Examples of the present disclosure provide methods and apparatus, for video coding and a non-transitory computer-readable storage medium.

According to a first aspect of the present disclosure, a method of decoding a video block in geometry partition mode (GPM) is provided. The method may include partitioning the video block into first and second geometric partitions. The method may include obtaining a first motion vector refinement (MVR) for the first geometric partition. The method may include obtaining a second MVR for the second geometric partition. The method may include obtaining a candidate list that comprises a plurality of motion vectors (MVs). The method may include obtaining a first MV from the candidate list for the first geometric partition. The method may include obtaining a second MV from the candidate list for the second geometric partition. The method may include calculating a third MV by adding the first MV with the first MVR for the first geometric partition. The method may include calculating a fourth MV by adding the second MV with the second MVR for the second geometric partition. The method may include obtaining prediction samples of the first and second geometric partitions based on the third and fourth MVs.

According to a second aspect of the present disclosure, a method of encoding a video block in GPM is provided. The method may include partitioning the video block into first and second geometric partitions. The method may include obtaining a first MV for the first geometric partition and a second MV for the second geometric partition. The method may include obtaining a candidate list that comprises a plurality of MVs for the video block. The method may include selecting a third MV from the candidate list for the first geometric partition. The method may include selecting a fourth MV from the candidate list for the second geometric partition. The method may include calculating a first MVR by subtracting the third MV from the first MV for the first geometric partition. The method may include calculating a second MVR by subtracting the fourth MV from the second MV for the second geometric partition. The method may include obtaining prediction samples of the first and second geometric partitions based on the first and second MVs.

According to a third aspect of the present disclosure, an apparatus for video coding is provided. The apparatus may comprise one or more processors and a non-transitory computer-readable storage medium. The non-transitory computer-readable storage medium is configured to store instructions executable by the one or more processors. The one or more processors, upon execution of the instructions, are configured to perform the method in the first or second aspect.

According to a fourth aspect of the present disclosure, a non-transitory computer-readable storage medium is provided. The non-transitory computer-readable storage medium may store computer-executable instructions that, when executed by one or more computer processors, cause the one or more computer processors to perform the method in the first or second aspect.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
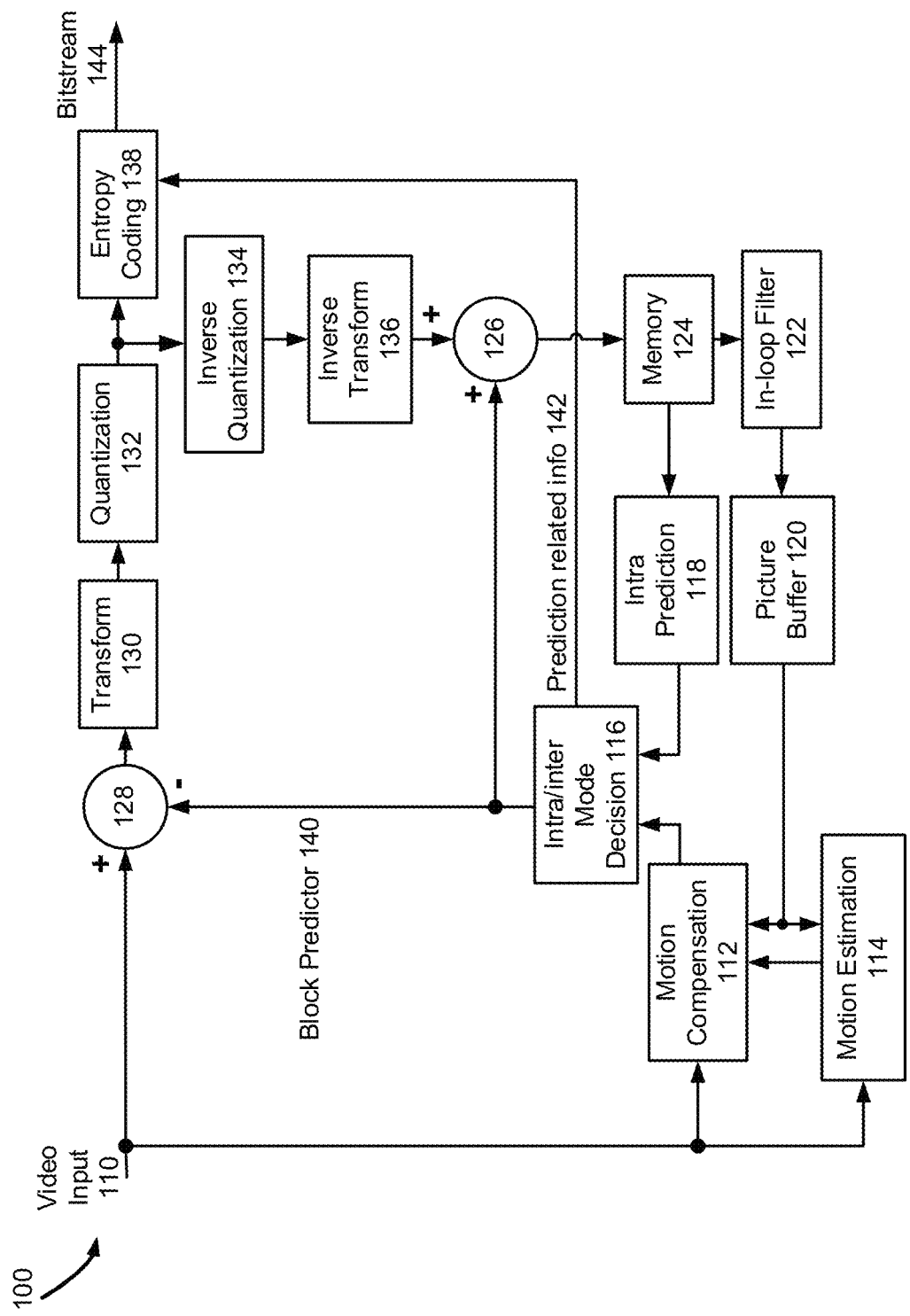
FIG. 1 is a block diagram of an encoder according to an example of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure, as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. In May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

Like the HEVC, the AVS3 standard is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture store the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture store of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). Different from the HEVC which partitions blocks only based on quad-trees, in the AVS3, one coding tree unit (CTU) is split into CUs to adapt to varying local characteristics based on quad/binary/extended-quad-tree. Additionally, the concept of multiple partition unit type in the HEVC is removed, i.e., the separation of CU, prediction unit (PU) and transform unit (TU) does not exist in the AVS3; instead, each CU is always used as the basic unit for both prediction and transform without further partitions. In the tree partition structure of the AVS3, one CTU is firstly partitioned based on a quad-tree structure. Then, each quad-tree leaf node can be further partitioned based on a binary and extended-quad-tree structure.

As shown in FIGS. 3A, 3B, 3C, 3D, and 3E, there are five splitting types, quaternary partitioning, horizontal binary partitioning, vertical binary partitioning, horizontal extended quad-tree partitioning, and vertical extended quad-tree partitioning.

Figures 3A, 3B, 3C:
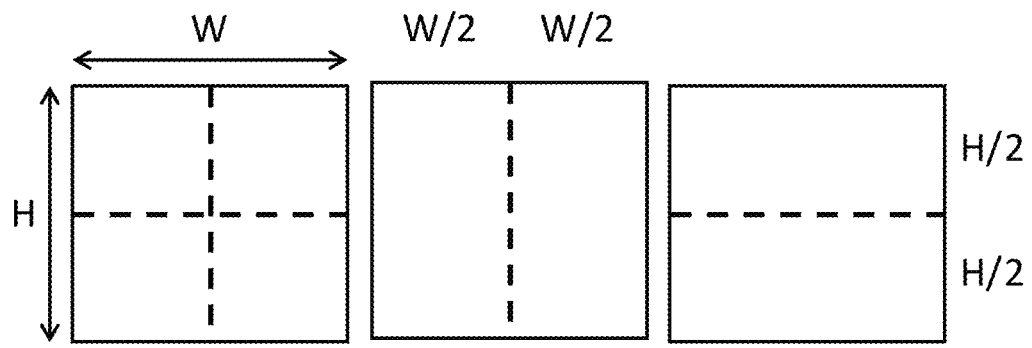
FIG. 3A is a diagram illustrating block partitions in a multi-type tree structure according to an example of the present disclosure.
FIG. 3B is a diagram illustrating block partitions in a multi-type tree structure according to an example of the present disclosure.
FIG. 3C is a diagram illustrating block partitions in a multi-type tree structure according to an example of the present disclosure.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

Figures 3D, 3E:
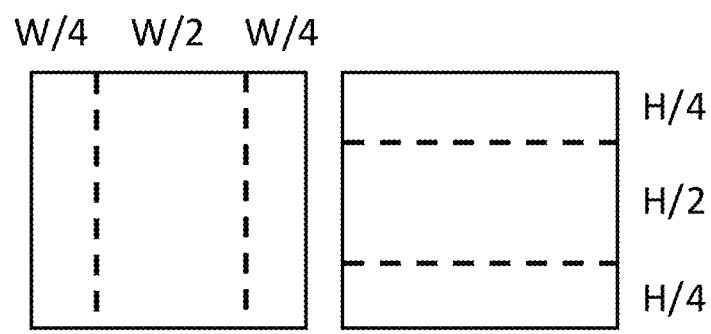
FIG. 3D is a diagram illustrating block partitions in a multi-type tree structure according to an example of the present disclosure.
FIG. 3E is a diagram illustrating block partitions in a multi-type tree structure according to an example of the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes from. After spatial and/or temporal prediction, the mode decision block in the encoder chooses the best prediction mode, for example based on the rate-distortion optimization method. The prediction block is then subtracted from the current video block; and the prediction residual is de-correlated using transform and then quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used as reference to code future video blocks. To form the output video bitstream, coding mode (inter or intra), prediction mode information, motion information, and quantized residual coefficients are all sent to the entropy coding unit to be further compressed and packed.

Figure 2:
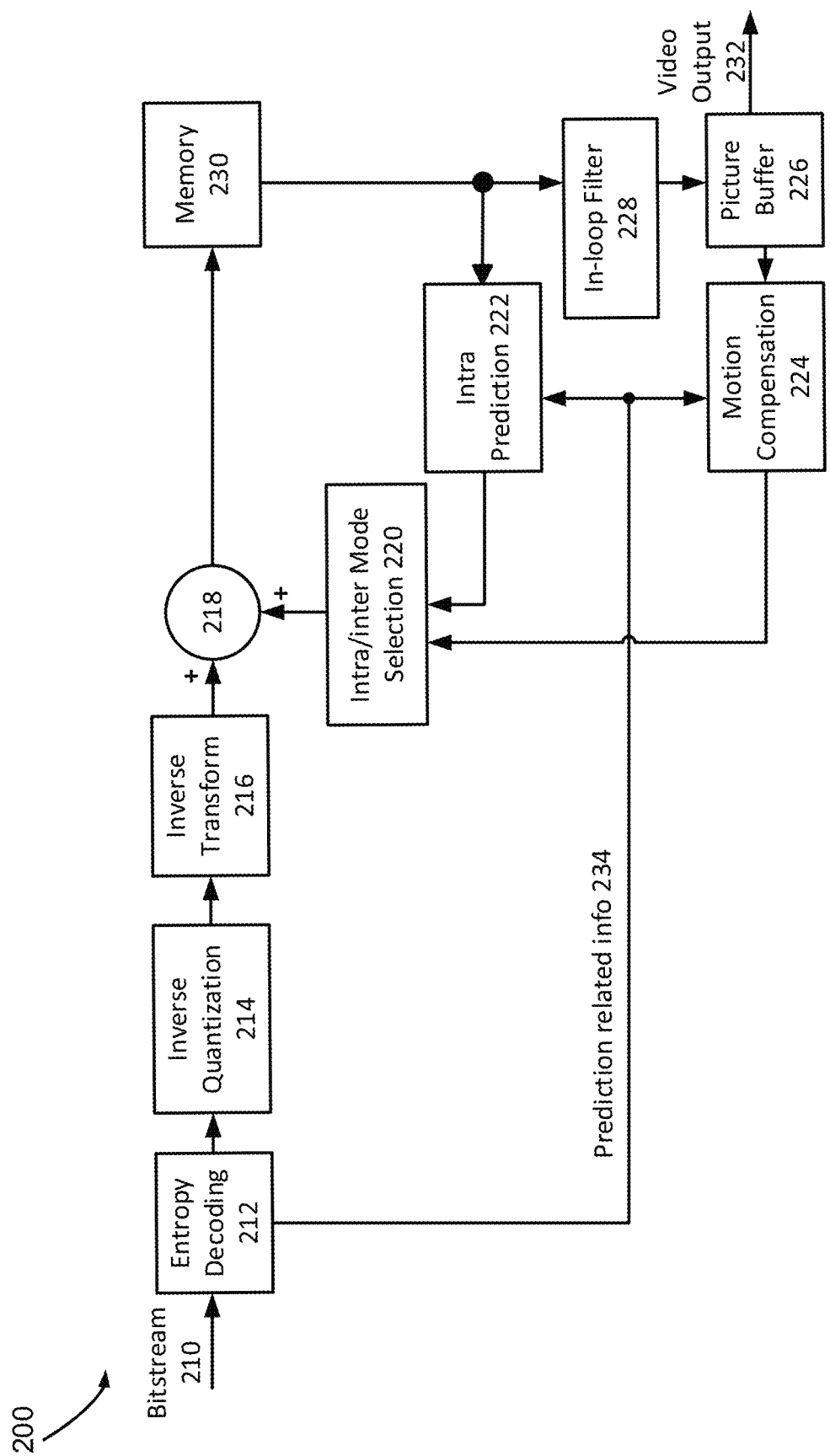
FIG. 2 is a block diagram of a decoder according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bitstream is first entropy decoded at entropy decoding unit. The coding mode and prediction information are sent to either the spatial prediction unit (if intra coded) or the temporal prediction unit (if inter-coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out for display, as well as used to predict future video blocks.

The focus of the disclosure is to improve the coding performance of the geometric partition mode (GPM) that are used in both the VVC and the AVS3 standards. In the AVS3, the tool is also known as angular weighted prediction (AWP) which follows the same design spirit of GPM but with some subtle differences in certain design details. To facilitate the description of the disclosure, in the following, the existing GPM design in the VVC standard is used as an example to explain the main aspects of the GPM/AWP tool. Meanwhile, another existing inter-prediction technology called merge mode with motion vector differences (MMVD) that are applied in both VVC and AVS3 standards are also briefly reviewed, given that it is closely related with the proposed technologies in this disclosure. After that, some drawbacks of the current GPM/AWP design are identified. Finally, the proposed methods are provided in details. Please note that though the existing GPM design in the VVC standard is used as the example throughout the disclosure, to a person skilled in the art of modern video coding technologies, the proposed technologies can also be applied to other GPM/AWP designs or other coding tools with the same or similar design spirit.

Geometric Partition Mode (GPM)

In the VVC, a geometric partitioning mode is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8.

Figure 4:
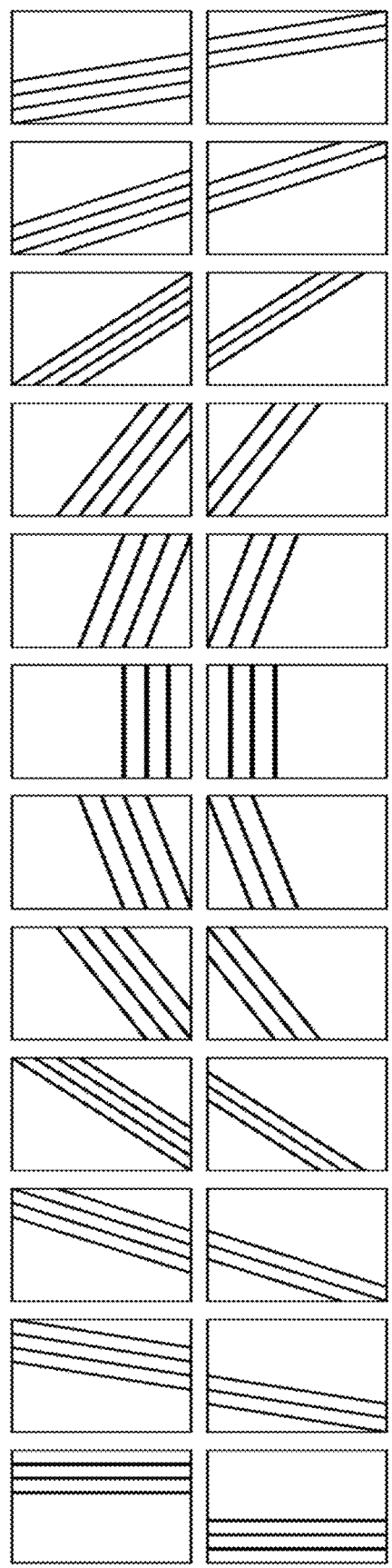
FIG. 4 is an illustration of allowed geometric partition (GPM) partitions according to an example of the present disclosure.

When this mode is used, a CU is split into two parts by a geometrically located straight line, as shown in FIG. 4 (description provided below). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signaled. The number of maximum GPM candidate size is signaled explicitly at sequence level.

FIG. 4 shows allowed GPM partitions, where the splits in each picture have one identical split direction.

Uni-Prediction Candidate List Construction

To derive the uni-prediction motion vector for one geometric partition, one uni-prediction candidate list is firstly derived directly from the regular merge candidate list generation process. Denote n as the index of the uni-prediction motion in the geometric uni-prediction candidate list. The LX motion vector of the n-th merge candidate, with X equal to the parity of n, is used as the n-th uni-prediction motion vector for geometric partitioning mode.

These motion vectors are marked with "x" in FIG. 5 (described below). In case a corresponding LX motion vector of the n-the extended merge candidate does not exist, the L (1−X) motion vector of the same candidate is used instead as the uni-prediction motion vector for geometric partitioning mode.

Figures 5, 6A, 6B:
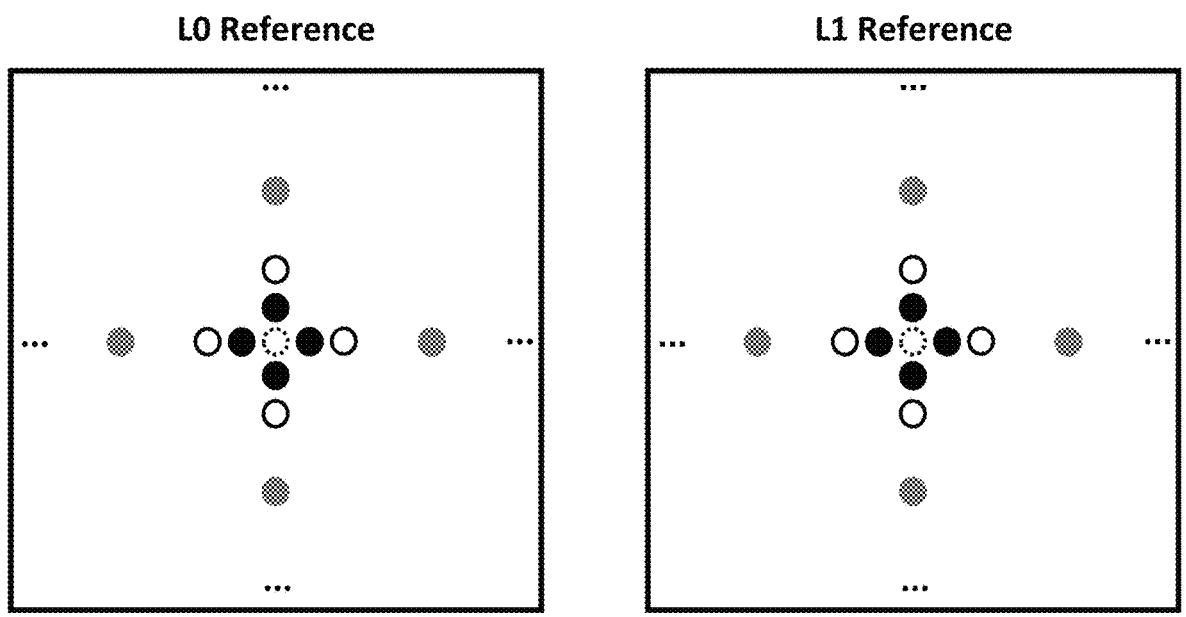
FIG. 5 is a table illustrating a uni-prediction motion vector selection according to an example of the present disclosure.
FIG. 6A is an illustration of a motion vector differences (MMVD) mode according to an example of the present disclosure.
FIG. 6B is an illustration of an MMVD mode according to an example of the present disclosure.

FIG. 5 shows a uni-prediction motion vector selection from the motion vectors of merge candidate list for the GPM.

Blending Along Geometric Partition Edge

After each geometric partition is obtained using its own motion, blending is applied to the two uni-prediction signals to derive samples around geometric partition edge. The blending weight for each position of the CU are derived based on the distance from each individual sample position to the corresponding partition edge.

GPM Signaling Design

According to the current GPM design, the usage of the GPM is indicated by signaling one flag at the CU-level. The flag is only signaled when the current CU is coded by either merge mode or skip mode. Specifically, when the flag is equal to one, it indicates the current CU is predicted by the GPM. Otherwise (the flag is equal to zero), the CU is coded by another merge mode such as regular merge mode, merge mode with motion vector differences, combined inter and intra prediction, and so forth. When the GPM is enabled for the current CU, one syntax element, namely merge_gpm_partition_idx, is further signaled to indicate the applied geometric partition mode (which specifies the direction and the offset of the straight line from the CU center that splits the CU into two partitions as shown in FIG. 4). After that, two syntax elements merge_gpm_idx0 and merge_gpm_idx1 are signaled to indicate the indices of the uni-prediction merge candidates that are used for the first and second GPM partitions. More specifically, those two syntax elements are used to determine the uni-directional MVs of the two GPM partitions from the uni-prediction merge list as described in the section "uni-prediction merge list construction." According to the current GPM design, in order to make two uni-directional MVs more different, the two indices cannot be the same. Based on such prior knowledge, the uni-prediction merge index of the first GPM partition is firstly signaled and used as the predictor to reduce the signaling overhead of the uni-prediction merge index of the second GPM partition. In details, if the second uni-prediction merge index is smaller than the first uni-prediction merge index, its original value is directly signaled. Otherwise (the second uni-prediction merge index is larger than the first uni-prediction merge index), its value is subtracted by one before being signaled to bitstream. At decoder side, the first uni-prediction merge index is firstly decoded. Then, for the decoding of the second uni-prediction merge index, if the parsed value is smaller than the first uni-prediction merge index, the second uni-prediction merge index is set equal to the parse value; otherwise (the parsed value is equal to or larger than the first uni-prediction merge index), the second uni-prediction merge index is set equal to the parsed value plus one. Table 1 illustrates the existing syntax elements that are used for the GPM mode in the current VVC specification.

TABLE 1

The existing GPM syntax elements in merge data syntax table of the VVC specification

|  | Descriptor |
|---|---|
| merge_data( x0, y0, cbWidth, cbHeight, chType ) { |  |
| ...... |  |
|   if( !ciip_flag[ x0 ][ y0 ] ) { |  |
|     merge_gpm_partition_idx[ x0 ][ y0 ] | ae(v) |
|     merge_gpm_idx0[ x0 ][ y0 ] | ae(v) |
|     if( MaxNumGpmMergeCand > 2 ) |  |

TABLE 1-continued

The existing GPM syntax elements in merge data
syntax table of the VVC specification

| | Descriptor |
|---|---|
| merge_gpm_idx1[ x0 ][ y0 ] | ae(v) |
| } | |
| ...... | |
| } | |

On the other hand, in the current GPM design, truncated unary code is used for the binarization of the two uni-prediction merge indices, i.e., merge_gpm_idx0 and merge_gpm_idx1. Additionally, because the two uni-prediction merge indices cannot be the same, different maximum values are used to truncate the code-words of the two uni-prediction merge indices, which are set equal to MaxGPMMergeCand-1 and MaxGPMMergeCand-2 for merge_gpm_idx0 and merge_gpm_idx1, respectively. MaxGPMMergeCand is the number of the candidates in the uni-prediction merge list.

When the GPM/AWP mode is applied, two different binarization methods are applied to translate the syntax merge_gpm_partition_idx into a string of binary bits. Specifically, the syntax element is binarized by fixed-length code and truncated binary code in the VVC and AVS3 standards, respectively. Meanwhile, for the AWP mode in the AVS3, different maximum values are used for the binarizations of the value of the syntax element. Specifically, in the AVS3, the number of the allowed GPM/AWP partition modes is 56 (i.e., the maximum value of merge_gpm_partition_idx is 55) while the number is increased to 64 (i.e., maximum value of merge_gpm_partition_idx is 63) in the VVC.

Merge Mode with Motion Vector Differences (MMVD)

In addition to conventional merge mode which derives the motion information of one current block from its spatial/temporal neighbors, the MMVD/UMVE mode is introduced in both the VVC and AVS standards as one special merge mode. Specifically, in both the VVC and AVS3, the mode is signaled by one MMVD flag at coding block level. In the MMVD mode, the first two candidates in the merge list for regular merge mode are selected as the two base merge candidates for MMVD. After one base merge candidate is selected and signaled, additional syntax elements are signaled to indicate the motion vector differences (MVDs) that are added to the motion of the selected merge candidate. The MMVD syntax elements include a merge candidate flag to select the base merge candidate, a distance index to specify the MVD magnitude and a direction index to indicate the MVD direction.

In the existing MMVD design, the distance index specifies MVD magnitude, which is defined based on one set of predefined offsets from the starting point. As shown in FIGS. 6A and 6B, the offset is added to either horizontal or vertical component of the starting MV (i.e., the MVs of the selected base merge candidate).

FIG. 6A shows an MMVD mode for the L0 reference. FIG. 6B shows an MMVD mode for the L1 reference.

Table 2 illustrates the MVD offsets that are applied in the AVS3, respectively.

TABLE 2

The MVD offset used in the AVS3

| Distance IDX | 0 | 1 | 2 | 3 | 4 |
|---|---|---|---|---|---|
| Offset (in unit of luma sample) | ¼ | ½ | 1 | 2 | 4 |

As shown in Table 3, the direction index is used to specify the signs of the signaled MVD. It is noted that the meaning of the MVD sign could be variant according to the starting MVs. When the starting MVs is a uni-prediction MV or bi-prediction MVs with MVs pointing to two reference pictures whose POCs are both larger than the POC of the current picture, or both smaller than the POC of the current picture, the signaled sign is the sign of the MVD added to the starting MV. When the starting MVs are bi-prediction MVs pointing to two reference pictures with one picture's POC larger than the current picture and the other picture's POC smaller than the current picture, the signaled sign is applied to the L0 MVD and the opposite value of the signaled sign is applied to the L1 MVD.

TABLE 3

The MVD sign as specified by the direction index

| Direction IDX | 00 | 01 | 10 | 11 |
|---|---|---|---|---|
| x-axis | + | − | N/A | N/A |
| y-axis | N/A | N/A | + | − |

Improvements to Geometric Partition Mode (GPM)

As mentioned in the introduction, the uni-directional motion that is used to generate the prediction samples of two GPM partitions are directly obtained from the regular merge candidates. In case there are not strong correlation between the MVs of spatial/temporal neighboring blocks, the derived uni-directional MV from merge candidates may not be accurate enough to capture the true motion of each GPM partition. Motion estimation is capable of offering more accurate motion which however comes at a cost of non-negligible signaling overhead due to arbitrary motion refinements that can be applied on top of the existing uni-directional MVs. On the other hand, the MVMD mode is utilized in both the VVC and AVS3 standards, which has been proven to be one efficient signaling mechanism to reduce the MVD signaling overhead. Therefore, it could also be beneficial to combine the GPM with the MMVD mode. Such combination can potentially improve the overall coding efficiency of the GPM tool by providing more accurate MVs to capture the individual motion of each GPM partition.

Proposed Methods

In this disclosure, methods are proposed to further improve the coding efficiency of the GPM by applying further motion refinements on top of the existing uni-directional MVs that are applied to each GPM partition. The proposed methods are named as geometric partition mode with motion vector refinement (GPM-MVR). Additionally, in the proposed schemes, motion refinements are signaled in one similar manner of the existing MMVD design, i.e., based on a set of predefined MVD magnitudes and directions of the motion refinements.

Geometric Partition Mode with Separate Motion Vector Refinements

To improve the coding efficiency of the GPM, in this section, one improved geometric partition mode with separate motion vector refinements is proposed. Specifically, given a GPM partition, the proposed method firstly uses the existing syntax merge_gpm_idx0 and merge_gpm_idx1 to identify the uni-directional MVs for two GPM partitions from the existing uni-prediction merge candidate list and use them as the base MVs. After the two base MVs are determined, two set of new syntax elements are introduced to specify the values of motion refinements that are applied on top of the base MVs of the two GPM partitions separately. Specifically, two flags, namely, gpm_mvr_partIdx0_enable_flag and gpm_mvr_partIdx1_enable_flag, are firstly signal to indicate whether the GPM-MVR is applied to the first and second GPM partition, respectively. When the flag of one GPM partition is equal to one, the corresponding value of the MVR that is applied to the base MV of the partition is signaled in the MMVD style, i.e., one distance index (as indicated by the syntax elements gpm_mvr_partIdx0_distance_idx and gpm_mvr_partIdx1_distance_idx) to specify the magnitude of the MVR and one direction index (as indicated by the syntax elements gpm_mvr_partIdx0_direction_idx and gpm_mvr_partIdx1_direction_idx) to specify the direction of the MVR. Table 4 illustrates the syntax elements that are introduced by the proposed GPM-MVR methods.

TABLE 4

The syntax elements of the proposed GPM-MVR method with separate MVRs for two GPM partitions (Method One)

| | Descriptor |
|---|---|
| merge_data( x0, y0, cbWidth, cbHeight, chType ) { | |
| ...... | |
|   if( !ciip_flag[ x0 ][ y0 ] ) { | |
|     merge_gpm_partition_idx[ x0 ][ y0 ] | ae(v) |
|     merge_gpm_idx0[ x0 ][ y0 ] | ae(v) |
|     merge_gpm_idx1[ x0 ][ y0 ] | ae(v) |
|       gpm_mvr_partIdx0_enable_flag[ x0 ][ y0 ] | ae(v) |
|       if( gpm_mvr_partIdx0_enable_flag[ x0 ][ y0 ] ) { | |
|         gpm_mvr_partIdx0_direction_idx[ x0 ][ y0 ] | ae(v) |
|         gpm_mvr_partIdx0_distance_idx[ x0 ][ y0 ] | ae(v) |
|       } | |
|     if( merge_gpm_idx0 != merge_gpm_idx1 \|\| gpm_mvr_partIdx0_enable_flag | |
|       gpm_mvr_partIdx1_enable_flag[ x0 ][ y0 ] | ae(v) |
|       if( gpm_mvr_partIdx1_enable_flag[ x0 ][ y0 ] ) { | |
|         gpm_mvr_partIdx1_direction_idx[ x0 ][ y0 ] | ae(v) |
|         gpm_mvr_partIdx1_distance_idx[ x0 ][ y0 ] | ae(v) |
|       } | |
|   } | |
| ...... | |
| } | |

Based on the proposed syntax elements as shown in Table 4, at decoder, the final MV that is used for generating the uni-prediction samples of each GPM partition is equal to the sum of the signaled motion vector refinement and the corresponding base MV. In practice, different sets of MVR magnitudes and directions may be predefined and applied to the proposed GPM-MVR scheme, which can offer various tradeoffs between the motion vector accuracy and signaling overhead. In one specific example, it is proposed to reuse the eight MVD offsets (i.e., ¼-, ½-, 1, 2, 4, 8-, 16- and 32-pel) and four MVD directions (i.e., +/−x- and y-axis) used in the VVC standard for the proposed GPM-MVR scheme. In another example, the existing five MVD offsets {¼-, ½-, 1, 2- and 4-pel} and four MVD directions (i.e., +/−x- and y-axis) used in the AVS3 standard are applied in the proposed GPM-MVR scheme.

Figure 7:
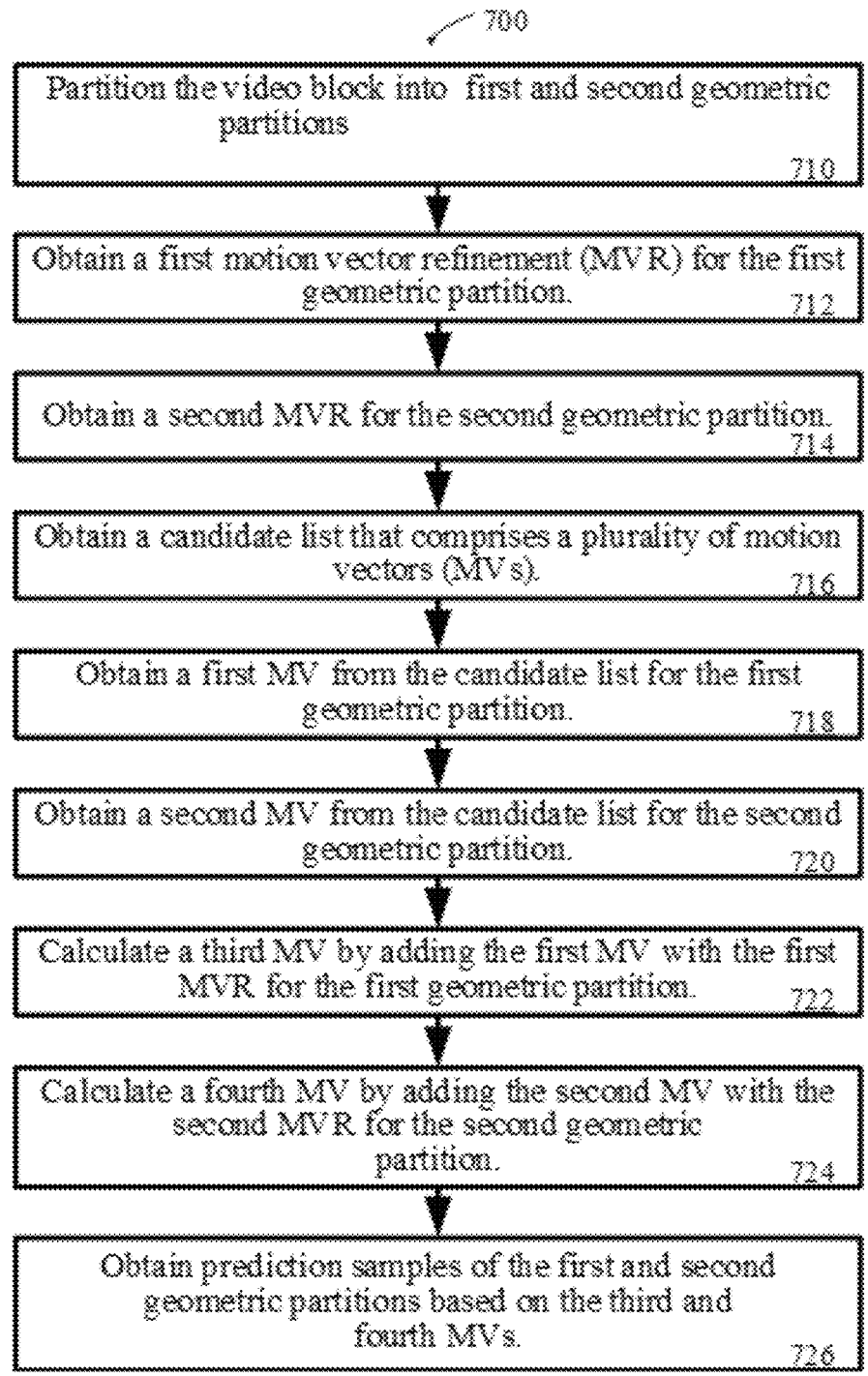
FIG. 7 is a method of decoding a video block in geometry partition mode (GPM) according to an example of the present disclosure.

FIG. 7 shows a method of decoding a video block in geometry partition mode (GPM) in accordance with the present disclosure. In step 710, the method may include partitioning the video block into first and second geometric partitions. In step 712, the method may include obtaining a first motion vector refinement (MVR) for the first geometric partition. In step 714, the method may include obtaining a second MVR for the second geometric partition. In step 716, the method may include obtaining a candidate list that comprises a plurality of motion vectors (MVs).

In step 718, the method may include obtaining a first MV from the candidate list for the first geometric partition. In step 720, the method may include obtaining a second MV from the candidate list for the second geometric partition. In step 722, the method may include calculating a third MV by adding the first MV with the first MVR for the first geometric partition. In step 724, the method may include calculating a fourth MV by adding the second MV with the second MVR for the second geometric partition. In step 726, the method may include obtaining prediction samples of the first and second geometric partitions based on the third and fourth MVs.

Figure 8:
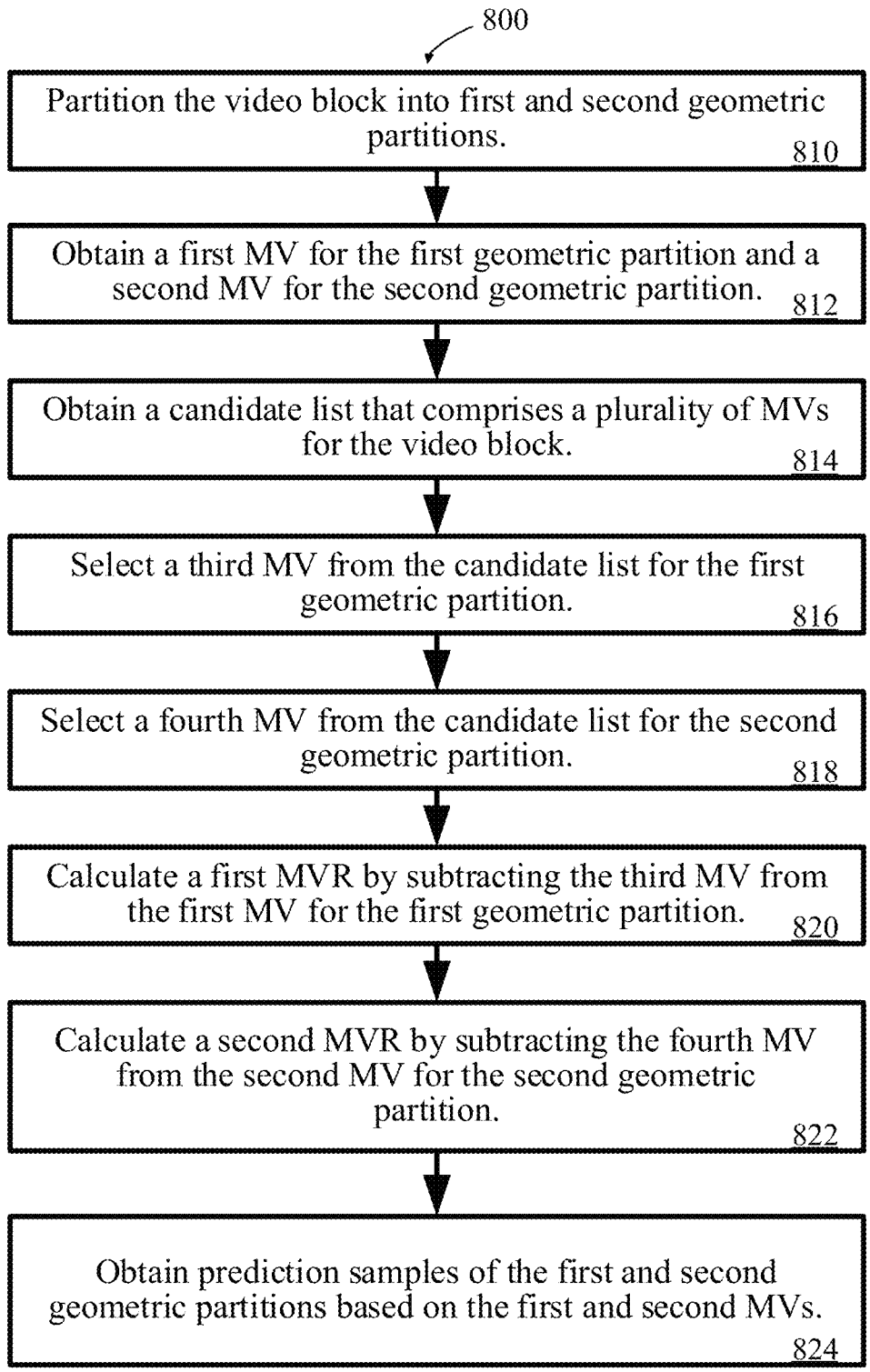
FIG. 8 is a method of encoding a video block in GPM according to an example of the present disclosure.

FIG. 8 shows a method of encoding a video block in GPM in accordance with the present disclosure. In step 810, the method may include partitioning the video block into first and second geometric partitions. In step 812, the method may include obtaining a first MV for the first geometric partition and a second MV for the second geometric partition. In step 814, the method may include obtaining a candidate list that comprises a plurality of MVs for the video block. In step 816, the method may include selecting a third MV from the candidate list for the first geometric partition.

In step 818, the method may include selecting a fourth MV from the candidate list for the second geometric partition. In step 820, the method may include calculating a first MVR by subtracting the third MV from the first MV for the first geometric partition. In step 822, the method may include calculating a second MVR by subtracting the fourth MV from the second MV for the second geometric partition. In step 824, the method may include obtaining prediction samples of the first and second geometric partitions based on the first and second MVs.

As discussed in the section "GPM signaling design," because the uni-directional MVs used for two GPM partitions cannot be identical, one constraint is applied in the existing GPM design that enforces the two uni-prediction merge indices to be different. However, in the proposed GPM-MVR scheme, further motion refinements are applied on top of the existing GPM uni-directional MVs. Therefore, even when the base MVs of two GPM partitions are identical, the final uni-directional MVs used for predicting two partitions could still be different as long as the values of two motion vector refinements are not the same. Based on the above consideration, the constraint (which restricts two uni-prediction merge indices to be different) is removed when the proposed GPM-MVR scheme is applied. Additionally, because the two uni-prediction merge indices are allowed to be identical, the same maximum value MaxGPMMergeCand-1 is used for the binarization of both merge_gpm_idx0 and merge_gpm_idx1, where MaxGPMMergeCand is the number of the candidates in the uni-prediction merge list.

As analyzed above, when the uni-prediction merge indices (i.e., merge_gpm_idx0 and merge_gpm_idx1) of two GPM partitions are identical, the values of the two motion vector refinements cannot be the same to ensure the final MVs used for the two partitions are different. Based on such condition, in one embodiment of the disclosure, one signaling redundancy removal method is proposed to use the MVR of the first GPM partition to reduce the signaling overhead of the MVR of the second GPM partition, when the uni-prediction merge indices of two GPM partitions are the same (i.e., merge_gpm_idx0 is equal to merge_gpm_idx1). In one example, the following signaling conditions are applied:

First, when the flag gpm_mvr_partIdx0_enable_flag is equal to 0 (i.e., the GPM-MVR is not applied to the first GPM partition), the flag of gpm_mvr_partIdx1_enable_flag is not signaled but inferred to be 1 (i.e., GPM-MVR is applied to the second GPM partition).

Second, when both flags gpm_mvr_partIdx0_enable_flag and gpm_mvr_partIdx1_enable_flag are equal to 1 (i.e., GPM-MVR are applied to two GPM partitions) and gpm_mvr_partIdx0_direction_idx is equal to gpm_mvr_partIdx1_direction_idx (i.e., the MVRs of two GPM partitions have the same direction), the magnitude of the MVR of the first GPM partition (i.e., gpm_mvr_partIdx0_distance_idx) is used to predict the magnitude of the MVR of the second GPM partition (i.e., gpm_mvr_partIdx1_distance_idx). Specifically, if gpm_mvr_partIdx1_distance_idx is smaller than gpm_mvr_partIdx0_distance_idx, its original value is directly signaled. Otherwise (gpm_mvr_partIdx1_distance_idx is larger than gpm_mvr_partIdx0_distance_idx), its value is subtracted by one before being signaled to bitstream. At decoder side, for decoding the value of gpm_mvr_partIdx1_distance_idx, if the parsed value is smaller than gpm_mvr_partIdx0_distance_idx, gpm_mvr_partIdx1_distance_idx is set equal to the parse value; otherwise (the parsed value is equal to or larger than gpm_mvr_partIdx0_distance_idx), gpm_mvr_partIdx1_distance_idx is set equal to the parsed value plus one. In such case, to further reduce the overhead, different maximum values MaxGPMMVRDistance-1 and MaxGPMMVRDistance-2 can be used for the binarizations of gpm_mvr_partIdx0_distance_idx and gpm_mvr_partIdx1_distance_idx, where MaxGPMMVRDistance is number of allowed magnitudes for the motion vector refinements.

In another embodiment, it is proposed to switch the signaling order to gpm_mvr_partIdx0_direction_idx/gpm_mvr_partIdx1_direction_idx and gpm_mvr_partIdx0_distance_idx/gpm_mvr_partIdx1_distance_idx such that the MVR directions are signaled in front of the MVR magnitudes. By this way, following the same logics as described above, the encoder/decoder may use the MVR direction of the first GPM partition to condition the signaling of the MVR direction of the second GPM partition. In another embodiment, it is proposed to signaling the MVR magnitude and direction of the second GPM partition first and use them to condition the signaling of the MVR magnitude and direction of the first GPM partition.

In another embodiment, it is proposed to signal the GPM-MVR related syntax elements before the signaling of the existing GPM syntax elements. Specifically, in such design, the two flags gpm_mvr_partIdx0_enable_flag and gpm_mvr_partIdx1_enable_flag are firstly signal to indicate whether the GPM-MVR is applied to the first and second GPM partition, respectively. When the flag of one GPM partition is equal to one, the distance index (as indicated by the syntax elements gpm_mvr_partIdx0_distance_idx and gpm_mvr_partIdx1_distance_idx) to specify the magnitude of the MVR and the direction index (as indicated by the syntax elements gpm_mvr_partIdx0_direction_idx and gpm_mvr_partIdx1_direction_idx) to specify the direction of the MVR. After that, the existing syntax merge_gpm_idx0 and merge_gpm_idx1 are signaled to identify the uni-directional MVs for two GPM partitions, i.e., based MVs. Table 5 illustrates the proposed GPM-MVR signaling scheme.

TABLE 5

The syntax elements of the proposed GPM-MVR method with separate MVRs for two GPM partitions (Method Two)

| | Descriptor |
|---|---|
| merge_data( x0, y0, cbWidth, cbHeight, chType ) { | |
| ...... | |
|   if( !ciip_flag[ x0 ][ y0 ] ) { | |
|     merge_gpm_partition_idx[ x0 ][ y0 ] | ae(v) |
|     gpm_mvr_partIdx0_enable_flag[ x0 ][ y0 ] | ae(v) |
|     if( gpm_mvr_partIdx0_enable_flag[ x0 ][ y0 ] ) { | |
|       gpm_mvr_partIdx0_direction_idx[ x0 ][ y0 ] | ae(v) |
|       gpm_mvr_partIdx0_distance_idx[ x0 ][ y0 ] | ae(v) |
|     } | |
|     gpm_mvr_partIdx1_enable_flag[ x0 ][ y0 ] | ae(v) |
|     if( gpm_mvr_partIdx1_enable_flag[ x0 ][ y0 ] ) { | |
|       gpm_mvr_partIdx1_direction_idx[ x0 ][ y0 ] | ae(v) |
|       gpm_mvr_partIdx1_distance_idx[ x0 ][ y0 ] | ae(v) |
|     } | |
|   } | |
|   merge_gpm_idx0[ x0 ][ y0 ] | ae(v) |
|   merge_gpm_idx1[ x0 ][ y0 ] | ae(v) |
| ...... | |
| } | |

Similar to the signaling method in Table 4, certain conditions may be applied when the GPM-MVR signaling method in Table 5 is applied to ensure that the resulting MVs used for the predictions of the two GPM partitions are not identical. Specifically, the following conditions are proposed to constraint the signaling of uni-prediction merge indices merge_gpm_idx0 and merge_gpm_idx1 depending on the values of the MVRs that are applied to the first and second GPM partitions:

First, when both the values of gpm_mvr_partIdx0_enable_flag and gpm_mvr_partIdx1_enable_flag are equal to 0 (i.e., the GPM-MVR is disabled for both two GPM partitions), the values of merge_gpm_idx0 and merge_gpm_idx1 cannot be the same;

Second, when gpm_mvr_partIdx0_enable_flag is equal to 1 (i.e., the GPM-MVR is enabled for the first GPM partition) and gpm_mvr_partIdx1_enable_flag is equal to 0 (i.e., the GPM-MVR is disabled for the second GPM partition), the values of merge_gpm_idx0 and merge_gpm_idx1 are allowed to be identical.

Third, when gpm_mvr_partIdx0_enable_flag is equal to 0 (i.e., the GPM-MVR is disabled for the first GPM partition) and gpm_mvr_partIdx1_enable_flag is equal to 1 (i.e., the GPM-MVR is enabled for the second GPM partition), the values of merge_gpm_idx0 and merge_gpm_idx1 are allowed to be identical.

Fourth, when both the values of gpm_mvr_partIdx0_enable_flag and gpm_mvr_partIdx1_enable_flag are equal to 1 (i.e., the GPM-MVR is enabled for both two GPM partitions), the determination on whether the values of merge_gpm_idx0 and merge_gpm_idx1 are allowed to be identical or not is dependent on the values of the MVRs (as indicated by gpm_mvr_partIdx0_direction_idx and gpm_mvr_partIdx0_distance_idx, and gpm_mvr_partIdx1_direction_idx and gpm_mvr_partIdx1_distance_idx) that are applied to the two GPM partitions. If the values of two MVRs are equal, merge_gpm_idx0 and merge_gpm_idx1 are disallowed to be identical. Otherwise (the values of two MVRs are unequal), the values of merge_gpm_idx0 and merge_gpm_idx1 are allowed to be identical.

In the above four cases, when the values of merge_gpm_idx0 and merge_gpm_idx1 are disallowed to be identical, the index value of one partition can be used as a predictor for the index value of the other partition. In one method, it is proposed to firstly signal merge_gpm_idx0 and use its value to predict merge_gpm_idx1. Specifically, at an encoder, when merge_gpm_idx1 is greater than merge_gpm_idx0, the value of merge_gpm_idx1 that is sent to a decoder is reduced by 1. At the decoder, when the received value of merge_gpm_idx1 is equal to or greater than the received value of merge_gpm_idx0, the value of merge_gpm_idx1 is increased by 1. In another method, it is proposed to firstly signal merge_gpm_idx1 and use its value to predict merge_gpm_idx0. In such case, therefore, at the encoder, when merge_gpm_idx0 is greater than merge_gpm_idx1, the value of merge_gpm_idx0 that is sent to the decoder is reduced by 1. At the decoder, when the received value of merge_gpm_idx0 is equal to or greater than the received value of merge_gpm_idx1, the value of merge_gpm_idx0 is increased by 1. Additionally, similar to the existing GPM signaling design, different maximum values MaxGPMMergeCand-1 and MaxGPMMergeCand-2 can be used for the binarization of the first and second index values according to the signaling order, respectively. On the other hand, when the values of merge_gpm_idx0 and merge_gpm_idx1 are allowed to be identical because there is no correlation between the two index values, the same maximum value MaxGPMMergeCand-1 is used for the binarization of both two index values.

Geometric Partition Mode with Symmetric Motion Vector Refinement

For the GPM-MVR methods discussed above, two separate MVR values are signaled with one being applied to improve the base MV of only one GPM partition. Such method can be efficient with regards to the improvement of prediction accuracy by allowing independent motion refinement for each GPM partition. However, such flexible motion refinement comes at a cost of increasing signaling overhead given that two different set of GMP-MVR syntax elements need to be sent from encoder to decoder. To reduce the signaling overhead, in this section, one geometric partition mode with symmetric motion vector refinement is proposed. Specifically, in this method, one single MVR value is signaled for one GPM CU and is used for both two GPM partitions according to the symmetry relationship between the picture order count (POC) values of the current picture and the reference pictures associated with two GPM partitions. Table 6 illustrates the syntax elements when the proposed method is applied.

TABLE 6

The syntax elements of the proposed GPM-MVR method with symmetric MVRs for two GPM partitions (Method One)

| | Descriptor |
|---|---|
| merge_data( x0, y0, cbWidth, cbHeight, chType ) { | |
|   if( !ciip_flag[ x0 ][ y0 ] ) { | |

TABLE 6-continued

The syntax elements of the proposed GPM-MVR method with symmetric MVRs for two GPM partitions (Method One)

| | Descriptor |
|---|---|
|     merge_gpm_partition_idx[ x0 ][ y0 ] | ae(v) |
|     merge_gpm_idx0[ x0 ][ y0 ] | ae(v) |
|     merge_gpm_idx1[ x0 ][ y0 ] | ae(v) |
|     gpm_mvr_enable_flag[ x0 ][ y0 ] | ae(v) |
|     if( gpm_mvr_enable_flag[ x0 ][ y0 ] ) { | |
|       gpm_mvr_direction_idx[ x0 ][ y0 ] | ae(v) |
|       gpm_mvr_distance_idx[ x0 ][ y0 ] | ae(v) |
|     } | |
| ...... | |
| } | |

As shown in Table 6, after the base MVs of two GPM partitions are selected (based on merge_gpm_idx0 and merge_gpm_idx1), one flag gpm_mvr_enable_flag is signaled to indicate whether the GPM-MVR mode is applied to the current GPM CU or not. When the flag is equal to one, it indicates the motion refinement is applied to enhance the base MVs of two GPM partitions. Otherwise (when the flag is equal to zero), it indicates that the motion refinement is applied to neither of two partitions. If the GPM-MVR mode is enabled, additional syntax elements are further signaled to specify the values of the applied MVR by a direction index gpm_mvr_direction_idx and a magnitude index gpm_mvr_distance_idx. Additionally, similar to the MMVD mode, the meaning of MVR sign could be variant according to the relationship among the POCs of the current picture and two reference pictures of GPM partitions. Specifically, when both the POCs of two reference pictures are larger than or smaller than the POC of the current picture, the signaled sign is the sign of the MVR that is added to both two base MVs. Otherwise (when the POC of one reference picture is larger than the current picture while the POC of the other reference picture is smaller than the current picture), the signaled sign is applied to the MVR of the first GPM partition and the opposite sign is applied to the second GPM partition. In Table 6, the values of merge_gpm_idx0 and merge_gpm_idx1 are allowed to be identical.

In another embodiment, it is proposed to signal two different flags to separately control the enabling/disabling of the GPM-MVR mode for two GPM partitions separately. However, when the GPM-MVR mode is enabled, only one MVR is signaled based on the syntax elements gpm_mvr_direction_idx and gpm_mvr_distance_idx. The corresponding syntax table of such signaling method is illustrated in Table 7.

TABLE 7

The syntax elements of the proposed GPM-MVR method with symmetric MVRs for two GPM partitions (Method Two)

| | Descriptor |
|---|---|
| merge_data( x0, y0, cbWidth, cbHeight, chType ) { | |
| ...... | |
|   if( !ciip_flag[ x0 ][ y0 ] ) { | |
|     merge_gpm_partition_idx[ x0 ][ y0 ] | ae(v) |
|     merge_gpm_idx0[ x0 ][ y0 ] | ae(v) |
|     merge_gpm_idx1[ x0 ][ y0 ] | ae(v) |
|     gpm_mvr_partIdx0_enable_flag[ x0 ][ y0 ] | ae(v) |
|     if( merge_gpm_idx0 != merge_gpm_idx1 \|\| gpm_mvr_partIdx0_enable_flag ) | |
|       gpm_mvr_partIdx1_enable_flag[ x0 ][ y0 ] | ae(v) |
|     if( gpm_mvr_partIdx0_enable_flag[ x0 ][ y0 ] \|\| | |

TABLE 7-continued

The syntax elements of the proposed GPM-MVR method with symmetric MVRs for two GPM partitions (Method Two)

| | Descriptor |
|---|---|
| gpm_mvr_partIdx1_enable_flag[ x0 ][ y0 ] ) { | |
|     gpm_mvr_direction_idx[ x0 ][ y0 ] | ae(v) |
|     gpm_mvr_distance_idx[ x0 ][ y0 ] | ae(v) |
| } | |
| ...... | |
| } | |

When the signaling method in Table 7 is applied, the values of merge_gpm_idx0 and merge_gpm_idx1 are allowed to be identical. However, to ensure that the resulting MVs applied to two GPM partitions are not redundant, when the flag gpm_mvr_partIdx0_enable_flag is equal to 0 (i.e., the GPM-MVR is not applied to the first GPM partition), the flag gpm_mvr_partIdx1_enable_flag is not signaled but inferred to be 1 (i.e., GPM-MVR is applied to the second GPM partition).

Adaptation of the Allowed MVRs for the GPM-MVR

In the GPM-MVR methods discussed above, one fixed group of MVR values are used for the GPM CUs at both encoder and decoder in one video sequence. Such design is suboptimal for video contents with high resolutions or with fierce motion. In those cases, the MVs tend to be much large such that fixed MVR values may not be optimal to capture the real motion of those blocks. To further improve the coding performance of the GPM-MVR mode, it is proposed in this disclosure to support the adaptation of the MVR values that are allowed to be selected by the GPM-MVR mode at various coding level, such as sequence level, picture/slice picture, coding block group level and so forth. For example, multiple MVR sets as well as the corresponding code-words may be derived off-line according to the specific motion characteristics of different video sequences. The encoder may select the best MVR set and signal the corresponding index of the selected set to decoder.

Encoder Speed-Up Logics for GPM-MVR Rate-Distortion Optimization

For the proposed GPM-MVR schemes, to determine the optimal MVR for each GPM partition, encoder may need to test the rate-distortion cost of each GPM partition multiple times, each with varying the MVR values that are being applied. This could significantly increase the encoding complexity of the GPM mode. In order to address the encoding complexity issue, the following fast encoding logics are proposed in this section:

First, due to the quad-/binary-/ternary-tree block partition structure that is applied in the VVC and AVS3, one same coding block can be checked during the rate-distortion optimization (RDO) process, each divided through one different partition path. In the current VTM/HPM encoder implementations, the GPM and GPM-MVR modes along with other inter and intra coding modes are always tested whenever one same CU is obtained through different block partition combinations. Generally speaking, for different partition paths, only the neighboring blocks of one CU could be different, which, however, should have a relatively minor impact on the optimal coding mode that one CU will select. Based on such consideration, to reduce the total number of GPM RDO being applied, it is proposed to store the decision whether the GPM mode is selected when the RD cost of one CU is checked for the first time. After that, when the same CU is checked by the RDO process again (by another partition path), the RD cost of the GPM (including GPM-MVR) is checked only if the GPM is selected for the CU at the first time. In case when the GPM is not selected for the initial RD checking of one CU, only the GPM (without GPM-MVR) is tested when the same CU is achieved through another partition path. In another method, when the GPM is not selected for the initial RD checking of one CU, both the GPM and GPM-MVR are not tested when the same CU is achieved through another partition path.

Second, to reduce the number of GPM partitions for the GPM-MVR mode, it is proposed to maintain the first M GPM partition modes without the smallest RD costs when the RD cost of one CU is checked for the first time. After that, when the same CU is checked by the RDO process again (by another partition path), only those M GPM partition modes are tested for the GPM-MVR mode.

Third, to reduce the number of GPM partitions that are tested for the initial RDO process of one, for each GPM partition, it is proposed to firstly calculate the sum absolute difference (SAD) values when using different uni-prediction merge candidates for two GPM partitions. Then, for each GPM partition under one specific partition mode, select the best uni-prediction merge candidate with the smallest SAD values and calculate the corresponding SAD value of the partition mode which is equal to the sum of the SAD values of best uni-prediction merge candidates for two GPM partition. Then, for the following RD process, only the first N partition modes with the best SAD values for the previous step are tested for the GPM-MVR mode.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Figure 9:
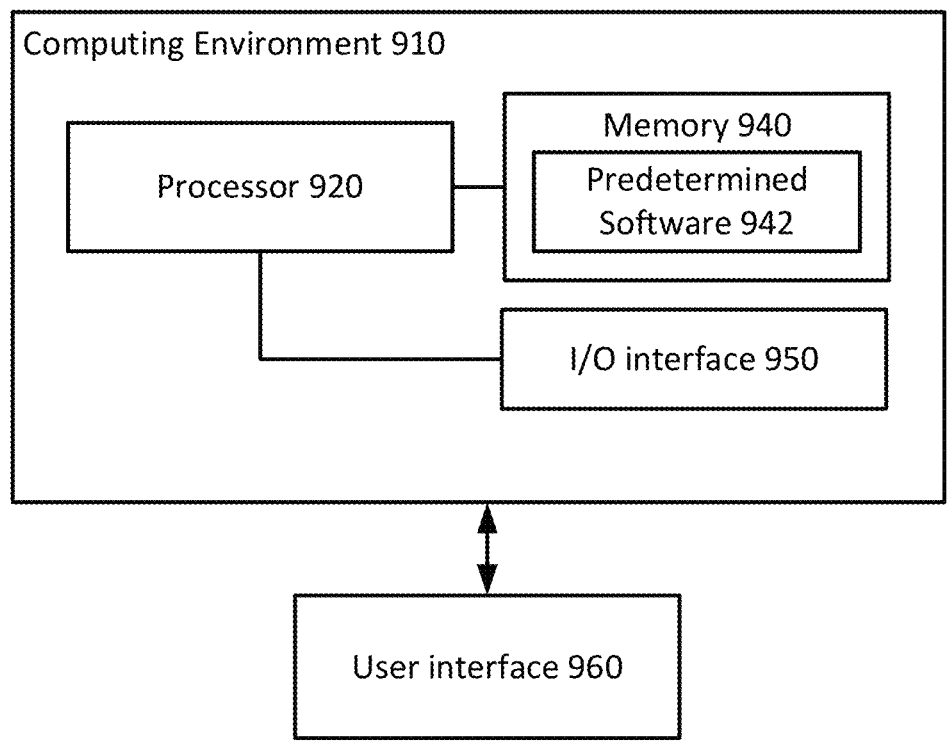
FIG. 9 is a diagram illustrating a computing environment coupled with a user interface according to an example of the present disclosure.

FIG. 9 shows a computing environment (or a computing device) 910 coupled with a user interface 960. The computing environment 910 can be part of a data processing server. In some embodiments, the computing device 910 can perform any of various methods or processes (such as encoding/decoding methods or processes) as described hereinbefore in accordance with various examples of the present disclosure. The computing environment 910 may include a processor 920, a memory 940, and an I/O interface 950.

The processor 920 typically controls overall operations of the computing environment 910, such as the operations associated with the display, data acquisition, data communications, and image processing. The processor 920 may include one or more processors to execute instructions to perform all or some of the steps in the above-described methods. Moreover, the processor 920 may include one or more modules that facilitate the interaction between the processor 920 and other components. The processor may be a Central Processing Unit (CPU), a microprocessor, a single chip machine, a GPU, or the like.

The memory 940 is configured to store various types of data to support the operation of the computing environment 910. Memory 940 may include predetermine software 942. Examples of such data include instructions for any applications or methods operated on the computing environment 910, video datasets, image data, etc. The memory 940 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 950 provides an interface between the processor 920 and peripheral interface modules, such as a keyboard, a click wheel, buttons, and the like. The buttons may include but are not limited to, a home button, a start scan button, and a stop scan button. The I/O interface 950 can be coupled with an encoder and decoder.

In some embodiments, there is also provided a non-transitory computer-readable storage medium comprising a plurality of programs, such as comprised in the memory 940, executable by the processor 920 in the computing environment 910, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 910 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUS), controllers, micro-controllers, microprocessors, or other electronic components, for performing the above methods.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

In accordance with various aspects of the present disclosure, the following examples can be provided.

In one or more examples, a method is provided for decoding a video block in geometry partition mode (GPM). The method may include: partitioning the video block into a first and second geometric partitions; obtaining a first motion vector refinement (MVR) for the first geometric partition; obtaining a second MVR for the second geometric partition; obtaining a candidate list that comprises a plurality of motion vectors (MVs); obtaining a first MV from the candidate list for the first geometric partition; obtaining a second MV from the candidate list for the second geometric partition; calculating a third MV by adding the first MV with the first MVR for the first geometric partition; calculating a fourth MV by adding the second MV with the second MVR for the second geometric partition; and obtaining prediction samples of the first and second geometric partitions based on the third and fourth MVs.

In one or more examples, obtaining the first MVR for the first geometric partition may include: receiving a syntax element gpm_mvr_partIdx0_enable_flag that indicates that the MVR is applied to the first geometric partition; receiving, in response to determining that gpm_mvr_partIdx0_enable_flag is equal to 1, two syntax elements gpm_mvr_partIdx0_direction_idx and gpm_mvr_partIdx0_distance_idx that indicate direction and magnitude of the first MVR.

In one or more examples, obtaining the second MVR for the second geometric partition may include: receiving a syntax element gpm_mvr_partIdx1_enable_flag that indicates that the MVR is applied to the second geometric partition; receiving, in response to determining that gpm_mvr_partIdx1_enable_flag is equal to 1, two syntax elements gpm_mvr_partIdx1_direction_idx and gpm_mvr_partIdx1_distance_idx that indicate direction and magnitude of the second MVR.

In one or more examples, obtaining the first MV from the candidate list and obtaining the second MV from the candidate list for the first geometric partition and the second geometric partition may include: receiving a syntax element merge_gpm_idx0 that indicates an index of the first MV in the candidate list for the first geometric partition; receiving a syntax element merge_gpm_idx1 that indicates an index of the second MV in the candidate list for the second geometric partition; and modifying values of merge_gpm_idx0 and merge_gpm_idx1 based on values of the first MVR and the second MVR that are applied to the first and second geometric partitions.

In one or more examples, modifying the values of merge_gpm_idx0 and merge_gpm_idx1 based on the values of the first MVR and the second MVR that are applied to the first and second geometric partitions may include: increasing, in response to determining that both gpm_mvr_partIdx0_enable_flag and gpm_mvr_partIdx1_enable_flag are equal to 0 and merge_gpm_idx1 is equal to or larger than merge_gpm_idx0, the value of merge_gpm_idx1 by 1.

In one or more examples, modifying the values of merge_gpm_idx0 and merge_gpm_idx1 based on the values of the first MVR and the second MVR that are applied to the first and second geometric partitions comprise: increasing, in response to determining that both gpm_mvr_partIdx0_enable_flag and gpm_mvr_partIdx1_enable_flag are equal to 1 and the values of the first MVR and the second MVR are equal and merge_gpm_idx1 is equal or large than merge_gpm_idx0, the value of merge_gpm_idx1 by 1.

In one or more examples, obtaining the first and second MVRs for the first and second geometric partitions may include: obtaining five MVR magnitudes that comprise ¼, ½, 1, 2, and 4 in unit of sample; and obtaining four MVR directions that comprise horizontal positive direction, horizontal negative direction, vertical positive direction, and vertical negative direction.

In one or more examples, obtaining the first and second MVRs for the first and second geometric partitions may include: obtaining eight MVR magnitudes that comprise ¼, ½, 1, 2, 4, 8, 16, and 32 in unit of sample; and obtaining four MVR directions that comprise horizontal positive direction, horizontal negative direction, vertical positive direction and vertical negative direction.

In one or more examples, obtaining the first and second MVRs for the first and second geometric partitions may include: receiving, from a bitstream, allowed MVRs at certain coding levels that comprise sequence level, picture/slice level, and block level.

In one or more examples, a method is provided for encoding a video block in geometry partition mode (GPM). The method may include: partitioning the video block into a first and second geometric partitions; obtaining a first MV for the first geometric partition and a second MV for the second geometric partition; obtaining a candidate list that comprises a plurality of MVs for the video block; selecting a third MV from the candidate list for the first geometric partition; selecting a fourth MV from the candidate list for the second geometric partition; calculating a first MVR by subtracting the third MV from the first MV for the first geometric partition; calculating a second MVR by subtracting the fourth MV from the second MV for the second geometric partition; and obtaining prediction samples of the first and second geometric partitions based on the first and second MVs.

In one or more examples, calculating the first MVR for the first geometric partition may include: sending, in response to determining that the first MVR is not equal to zero, a syntax element gpm_mvr_partIdx0_enable_flag that is set to 1 and two other syntax elements gpm_mvr_partIdx0_direction_idx and gpm_mvr_partIdx0_distance_idx that indicate direction and magnitude of the first MVR; sending, in response to determining that the first MVR is equal to zero, the syntax element gpm_mvr_partIdx0_enable_flag that is set to 0.

In one or more examples, calculating the second MVR for the second geometric partition may include: sending, in response to determining that the second MVR is not equal to zero, a syntax element gpm_mvr_partIdx1_enable_flag that is set to 1 and two other syntax elements gpm_mvr_partIdx1_direction_idx and gpm_mvr_partIdx1_distance_idx that indicate direction and magnitude of the second MVR; sending, in response to determining that the second MVR is equal to zero, the syntax element gpm_mvr_partIdx1_enable_flag that is set to 0.

In one or more examples, obtaining the first MV and the second MV may include: obtaining a value of merge_gpm_idx0 that specifies an index of the first MV in the candidate list for the first geometric partition; obtaining a value of merge_gpm_idx1 that specifies an index of the second MV in the candidate list for the second geometric partition; modifying the values of merge_gpm_idx0 and merge_gpm_idx1 based on values of the first MVR and the second MVR that are applied to the first and second geometric partitions; and sending merge_gpm_idx0 and merge_gpm_idx1 in a bitstream.

In one or more examples, modifying the values of merge_gpm_idx0 and merge_gpm_idx1 based on the values of the first MVR and the second MVR that are applied to the first and second geometric partitions may include: constraining, in response to determining that both gpm_mvr_partIdx0_enable_flag and gpm_mvr_partIdx1_enable_flag are equal to 0, merge_gpm_idx0 and merge_gpm_idx1 from being identical; and decreasing, when merge_gpm_idx1 is larger than merge_gpm_idx0, the value of merge_gpm_idx1 by 1.

In one or more examples, modifying the values of merge_gpm_idx0 and merge_gpm_idx1 based on the values of the first MVR and the second MVR that are applied to the first and second geometric partitions may include: constraining, in response to determining that both gpm_mvr_partIdx0_enable_flag and gpm_mvr_partIdx1_enable_flag are equal to 1 and the values of the first MVR and the second MVR are equal, merge_gpm_idx0 and merge_gpm_idx1 from being identical; and decreasing, when merge_gpm_idx1 is larger than merge_gpm_idx0, the value of merge_gpm_idx1 by 1.

In one or more examples, obtaining the first and second MVRs for the first and second geometric partitions may include: obtaining five MVR magnitudes that comprise ¼, ½, 1, 2, and 4 in unit of sample; and obtaining four MVR directions that comprise horizontal positive direction, horizontal negative direction, vertical positive direction, and vertical negative direction.

In one or more examples, obtaining the first and second MVRs for the first and second geometric partitions may include: obtaining eight MVR magnitudes that comprise ¼, ½, 1, 2, 4, 8, 16, and 32 in unit of sample; and obtaining four MVR directions that comprise horizontal positive direction, horizontal negative direction, vertical positive direction, and vertical negative direction.

In one or more examples, obtaining the first and second MVRs for the first and second geometric partitions may include: obtaining different sets of MVRs; and sending the different sets of MVRs in a bitstream at certain coding levels that comprise sequence level, picture/slice level, and block level.

In one or more examples, the method may further include: calculating, in response to a rate-distortion (RD) cost of the video block is checked for a first time and the GPM is selected, the RD cost of the video block with geometric partition mode for a second time; and not calculating, in response to the RD cost of the video block is checked for the first time and the GPM is not selected, the RD cost of the video block with geometric partition mode for a second time.

In one or more examples, the method may further include: calculating, in response to a rate-distortion (RD) cost of the video block is checked for a first time and the GPM is not selected, only the RD cost of the video block with GPM without applying the MVRs for a second time.

In one or more examples, the method may further include: maintaining, during RD cost calculation of the video block with GPM for a first time, M geometric partition modes that have best RD costs; checking, when calculating the RD cost of the video block with GPM for a second time, only the M geometric modes for the video block.

In one or more examples, the method may further include: calculating sum absolute difference (SAD) values of each geometric partition given one GPM using different MVs from the candidate list; selecting, for each GPM, two MV candidates with smallest SAD value for two geometric partitions; calculating a corresponding SAD value of a GPM as a sum of the SAD values of the two selected MV candidates for two geometric partitions; and checking, when calculating an RD cost of the video block with applying the MVRs, only the GPMs with best SAD values.

What is claimed is:

1. A method of decoding a video block in geometry partition mode (GPM), comprising:
   partitioning the video block into first and second geometric partitions;
   obtaining a first motion vector refinement (MVR) for the first geometric partition;
   obtaining a second MVR for the second geometric partition;

obtaining a candidate list that comprises a plurality of motion vectors (MVs);
obtaining a first MV from the candidate list for the first geometric partition;
obtaining a second MV from the candidate list for the second geometric partition;
calculating a third MV by adding the first MV with the first MVR for the first geometric partition;
calculating a fourth MV by adding the second MV with the second MVR for the second geometric partition; and
obtaining prediction samples of the first and second geometric partitions based on the third and fourth MVs,
wherein obtaining the first MV from the candidate list for the first geometric partition and obtaining the second MV from the candidate list for the second geometric partition comprises:
receiving a syntax element merge_gpm_idx0 that indicates an index of the first MV in the candidate list for the first geometric partition;
receiving a syntax element merge_gpm_idx1 that indicates an index of the second MV in the candidate list for the second geometric partition; and
modifying values of merge_gpm_idx0 and merge_gpm_idx1 based on values of the first MVR and the second MVR that are applied to the first and second geometric partitions.

2. The method of claim 1, wherein obtaining the first MVR for the first geometric partition comprises:
receiving a syntax element gpm_mvr_partIdx0_enable_flag that indicates that the MVR is applied to the first geometric partition;
receiving, in response to determining that gpm_mvr_partIdx0_enable_flag is equal to 1, two syntax elements gpm_mvr_partIdx0_direction_idx and gpm_mvr_partIdx0_distance_idx that indicate direction and magnitude of the first MVR.

3. The method of claim 1, wherein obtaining the second MVR for the second geometric partition comprises:
receiving a syntax element gpm_mvr_partIdx1_enable_flag that indicates that the MVR is applied to the second geometric partition;
receiving, in response to determining that gpm_mvr_partIdx1_enable_flag is equal to 1, two syntax elements gpm_mvr_partIdx1_direction_idx and gpm_mvr_partIdx1_distance_idx that indicate direction and magnitude of the second MVR.

4. The method of claim 1, wherein modifying the values of merge_gpm_idx0 and merge_gpm_idx1 based on the values of the first MVR and the second MVR that are applied to the first and second geometric partitions comprise:
increasing, in response to determining that both gpm_mvr_partIdx0_enable_flag and gpm_mvr_partIdx1_enable_flag are equal to 0 and merge_gpm_idx1 is equal to or larger than merge_gpm_idx0, the value of merge_gpm_idx1 by 1.

5. The method of claim 1, wherein modifying the values of merge_gpm_idx0 and merge_gpm_idx1 based on the values of the first MVR and the second MVR that are applied to the first and second geometric partitions comprise:
increasing, in response to determining that both the gpm_mvr_partIdx0_enable_flag and the gpm_mvr_partIdx1_enable_flag are equal to 1 and the values of the first MVR and the second MVR are equal and merge_gpm_idx1 is equal or large than merge_gpm_idx0, the value of merge_gpm_idx1 by 1.

6. The method of claim 1, wherein obtaining the first and second MVRs for the first and second geometric partitions comprises:
obtaining five MVR magnitudes that comprise ¼, ½, 1, 2, and 4 in unit of sample; and
obtaining four MVR directions that comprise horizontal positive direction, horizontal negative direction, vertical positive direction, and vertical negative direction.

7. The method of claim 1, wherein obtaining the first and second MVRs for the first and second geometric partitions comprises:
obtaining eight MVR magnitudes that comprise ¼, ½, 1, 2, 4, 8, 16, and 32 in unit of sample; and
obtaining four MVR directions that comprise horizontal positive direction, horizontal negative direction, vertical positive direction and vertical negative direction.

8. The method of claim 1, wherein obtaining the first and second MVRs for the first and second geometric partitions comprises:
receiving, from a bitstream, allowed MVRs at certain coding levels that comprise sequence level, picture/slice level, and block level.

9. An apparatus for decoding a video block in geometry partition mode (GPM), comprising:
one or more processors; and
a non-transitory computer-readable storage medium configured to store instructions executable by the one or more processors; wherein the one or more processors, upon execution of the instructions, are configured to:
partition the video block into first and second geometric partitions;
obtain a first motion vector refinement (MVR) for the first geometric partition;
obtain a second MVR for the second geometric partition;
obtain a candidate list that comprises a plurality of motion vectors (MVs);
obtain a first MV from the candidate list for the first geometric partition;
obtain a second MV from the candidate list for the second geometric partition;
calculate a third MV by adding the first MV with the first MVR for the first geometric partition;
calculate a fourth MV by adding the second MV with the second MVR for the second geometric partition; and
obtain prediction samples of the first and second geometric partitions based on the third and fourth MVs,
wherein to obtain the first MV from the candidate list for the first geometric partition and to obtain the second MV from the candidate list for the second geometric partition comprises:
receiving a syntax element merge_gpm_idx0 that indicates an index of the first MV in the candidate list for the first geometric partition;
receiving a syntax element merge_gpm_idx1 that indicates an index of the second MV in the candidate list for the second geometric partition; and
modifying values of merge_gpm_idx0 and merge_gpm_idx1 based on values of the first MVR and the second MVR that are applied to the first and second geometric partitions.

10. The apparatus of claim 9, wherein the one or more processors are configured to obtain the first MVR for the first geometric partition comprises that the one or more processors are configured to:
  receive a syntax element gpm_mvr_partIdx0_enable_flag that indicates that the MVR is applied to the first geometric partition;
  receive, in response to determining that gpm_mvr_partIdx0_enable_flag is equal to 1, two syntax elements gpm_mvr_partIdx0_direction_idx and gpm_mvr_partIdx0_distance_idx that indicate direction and magnitude of the first MVR.

11. The apparatus of claim 9, wherein the one or more processors are configured to obtain the second MVR for the second geometric partition comprises that the one or more processors are configured to:
  receive a syntax element gpm_mvr_partIdx1_enable_flag that indicates that the MVR is applied to the second geometric partition;
  receive, in response to determining that gpm_mvr_partIdx1_enable_flag is equal to 1, two syntax elements gpm_mvr_partIdx1_direction_idx and gpm_mvr_partIdx1_distance_idx that indicate direction and magnitude of the second MVR.

12. The apparatus of claim 9, wherein the one or more processors are configured to modify the values of merge_gpm_idx0 and merge_gpm_idx1 based on the values of the first MVR and the second MVR that are applied to the first and second geometric partitions comprises that the one or more processors are configured to:
  increase, in response to determining that both gpm_mvr_partIdx0_enable_flag and gpm_mvr_partIdx1_enable_flag are equal to 0 and merge_gpm_idx1 is equal to or larger than merge_gpm_idx0, the value of merge_gpm_idx1 by 1.

13. The apparatus of claim 9, wherein the one or more processors are configured to modify the values of merge_gpm_idx0 and merge_gpm_idx1 based on the values of the first MVR and the second MVR that are applied to the first and second geometric partitions comprises that the one or more processors are configured to:
  increase, in response to determining that both the gpm_mvr_partIdx0_enable_flag and the gpm_mvr_partIdx1_enable_flag are equal to 1 and the values of the first MVR and the second MVR are equal and merge_gpm_idx1 is equal or large than merge_gpm_idx0, the value of merge_gpm_idx1 by 1.

14. The apparatus of claim 9, wherein the one or more processors are configured to obtain the first and second MVRs for the first and second geometric partitions comprises that the one or more processors are configured to:
  obtain five MVR magnitudes that comprise ¼, ½, 1, 2, and 4 in unit of sample; and
  obtain four MVR directions that comprise horizontal positive direction, horizontal negative direction, vertical positive direction, and vertical negative direction.

15. The apparatus of claim 9, wherein the one or more processors are configured to obtain the first and second MVRs for the first and second geometric partitions comprises that the one or more processors are configured to:
  obtain eight MVR magnitudes that comprise ¼, ½, 1, 2, 4, 8, 16, and 32 in unit of sample; and
  obtain four MVR directions that comprise horizontal positive direction, horizontal negative direction, vertical positive direction and vertical negative direction.

16. The apparatus of claim 9, wherein the one or more processors are configured to obtain the first and second MVRs for the first and second geometric partitions comprises that the one or more processors are configured to:
  receive, from a bitstream, allowed MVRs at certain coding levels that comprise sequence level, picture/slice level, and block level.

17. A non-transitory computer-readable storage medium storing bitstream that when received by a decoding device causes the decoding device to:
  partition a video block into first and second geometric partitions;
  obtain a first motion vector refinement (MVR) for the first geometric partition;
  obtain a second MVR for the second geometric partition;
  obtain a candidate list that comprises a plurality of motion vectors (MVs);
  obtain a first MV from the candidate list for the first geometric partition;
  obtain a second MV from the candidate list for the second geometric partition;
  calculate a third MV by adding the first MV with the first MVR for the first geometric partition;
  calculate a fourth MV by adding the second MV with the second MVR for the second geometric partition; and
  obtain prediction samples of the first and second geometric partitions based on the third and fourth MVs,
  wherein to obtain the first MV from the candidate list for the first geometric partition and to obtain the second MV from the candidate list for the second geometric partition comprises:
    receiving a syntax element merge_gpm_idx0 that indicates an index of the first MV in the candidate list for the first geometric partition;
    receiving a syntax element merge_gpm_idx1 that indicates an index of the second MV in the candidate list for the second geometric partition; and
    modifying values of merge_gpm_idx0 and merge_gpm_idx1 based on values of the first MVR and the second MVR that are applied to the first and second geometric partitions.

18. The non-transitory computer-readable storage medium of claim 17, wherein the obtaining the first MVR for the first geometric partition comprises:
  receiving a syntax element gpm_mvr_partIdx0_enable_flag that indicates that the MVR is applied to the first geometric partition;
  receiving, in response to determining that gpm_mvr_partIdx0_enable_flag is equal to 1, two syntax elements gpm_mvr_partIdx0_direction_idx and gpm_mvr_partIdx0_distance_idx that indicate direction and magnitude of the first MVR.

* * * * *